United States Patent
Kuba et al.

(10) Patent No.: US 10,166,631 B2
(45) Date of Patent: Jan. 1, 2019

(54) LASER PROCESSING HEAD APPARATUS WITH CAMERA MONITOR

(71) Applicant: MITSUBISHI ELECTRIC CORPORATION, Chiyoda-ku (JP)

(72) Inventors: Kazuki Kuba, Chiyoda-ku (JP); Naoyuki Nakamura, Chiyoda-ku (JP); Akihiro Ueno, Amagasaki (JP)

(73) Assignee: MITSUBISHI ELECTRONIC CORPORATION, Chiyoda-ku (JP)

( * ) Notice: Subject to any disclaimer, the term of this patent is extended or adjusted under 35 U.S.C. 154(b) by 365 days.

(21) Appl. No.: 15/118,574

(22) PCT Filed: Mar. 2, 2015

(86) PCT No.: PCT/JP2015/056082
§ 371 (c)(1),
(2) Date: Aug. 12, 2016

(87) PCT Pub. No.: WO2015/137179
PCT Pub. Date: Sep. 17, 2015

(65) Prior Publication Data
US 2017/0043431 A1 Feb. 16, 2017

(30) Foreign Application Priority Data

Mar. 12, 2014 (JP) .................................. 2014-048553

(51) Int. Cl.
*B23K 26/03* (2006.01)
*B23K 26/32* (2014.01)
(Continued)

(52) U.S. Cl.
CPC ........ *B23K 26/032* (2013.01); *B23K 26/0648* (2013.01); *B23K 26/21* (2015.10); *B23K 26/32* (2013.01)

(58) Field of Classification Search
CPC ........ B23K 26/03; B23K 26/32; B23K 26/06; B23K 26/21
(Continued)

(56) References Cited

U.S. PATENT DOCUMENTS 6,670,574 B1 * 12/2003 Bates ..................... B23K 26/03
219/121.63
8,772,669 B2 * 7/2014 Idaka ................... B23K 26/032
219/121.6
(Continued)

FOREIGN PATENT DOCUMENTS

JP 9-225666 A 9/1997
JP 2001-287064 A 10/2001
(Continued)

OTHER PUBLICATIONS

International Search Report dated May 26, 2015 in PCT/JP2015/056082 (submitting English translation only).
(Continued)

*Primary Examiner* — Samuel M Heinrich
(74) *Attorney, Agent, or Firm* — Oblon, McClelland, Maier & Neustadt, L.L.P.

(57) ABSTRACT

A laser processing head apparatus with a camera monitor includes a light source for illumination having a near-infrared laser diode that generates a near-infrared laser beam of which upper limit value is a wavelength of a laser beam for processing, and out of processing point-emitted light, a processing point-reflected laser beam and illumination light for imaging, which have passed through a condensed lens and a laser beam reflection mirror and are directed to the camera respectively. An optical filter blocks transmission of the processing point-emitted light and the processing point-reflected laser beam, and transmits the illumination light for imaging.

20 Claims, 16 Drawing Sheets

(51) Int. Cl.
*B23K 26/06* (2014.01)
*B23K 26/21* (2014.01)

(58) Field of Classification Search
USPC .................................. 219/121.61–121.64
See application file for complete search history.

(56) References Cited

U.S. PATENT DOCUMENTS

| | | | |
|---|---|---|---|
| 9,027,668 B2* | 5/2015 | Zediker | E21B 7/14 |
| | | | 175/16 |
| 2009/0166342 A1* | 7/2009 | Kuno | B23K 26/046 |
| | | | 219/121.67 |
| 2013/0068738 A1 | 3/2013 | Schürmann et al. | |
| 2014/0326705 A1 | 11/2014 | Kodama et al. | |

FOREIGN PATENT DOCUMENTS

| | | |
|---|---|---|
| JP | 2003-149558 A | 5/2003 |
| JP | 2011-83779 A | 4/2011 |
| JP | 2012-55910 A | 3/2012 |
| JP | 2013-123743 A | 6/2013 |
| JP | 2013-528495 A | 7/2013 |
| WO | WO 2011/141135 A1 | 11/2011 |

OTHER PUBLICATIONS

Isao Torigoe, "Analysis of Laser Processing with High-speed Camera", Proceedings of the 77th Laser Materials Processing Conference, 2012, pp. 51-58 and Cover Page (with partial English translation).

* cited by examiner

FIG. 3
(a)
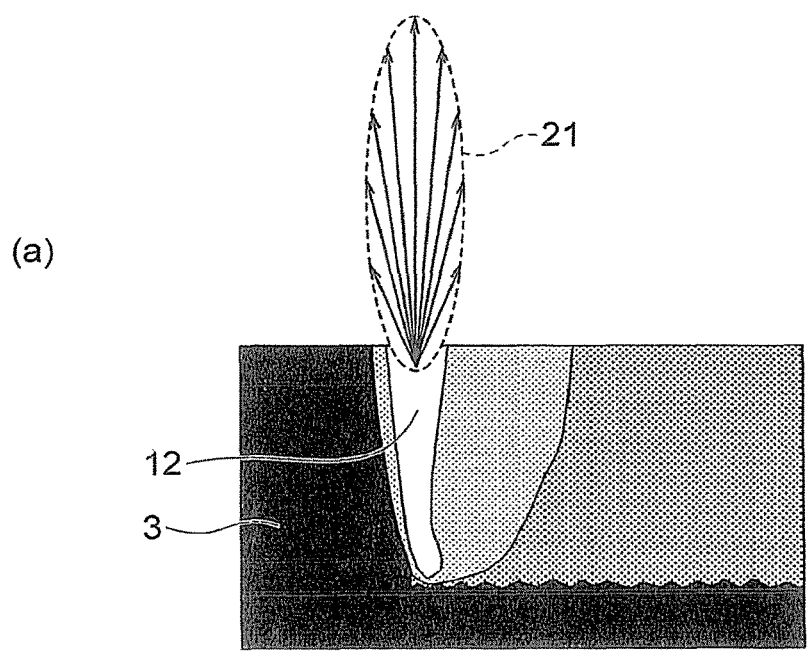
(b)
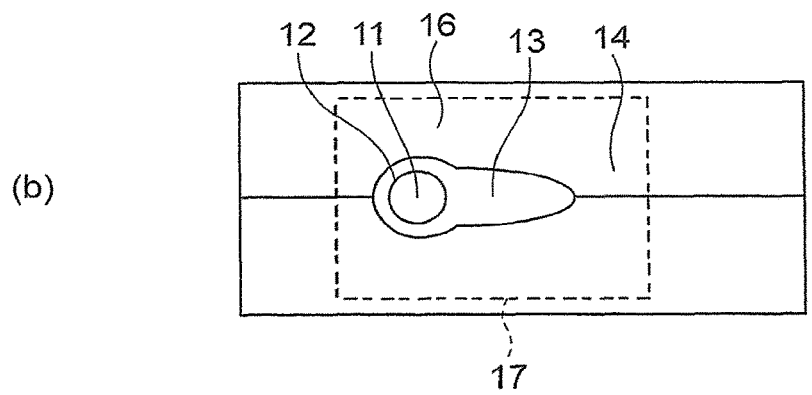

FIG. 4
(a) 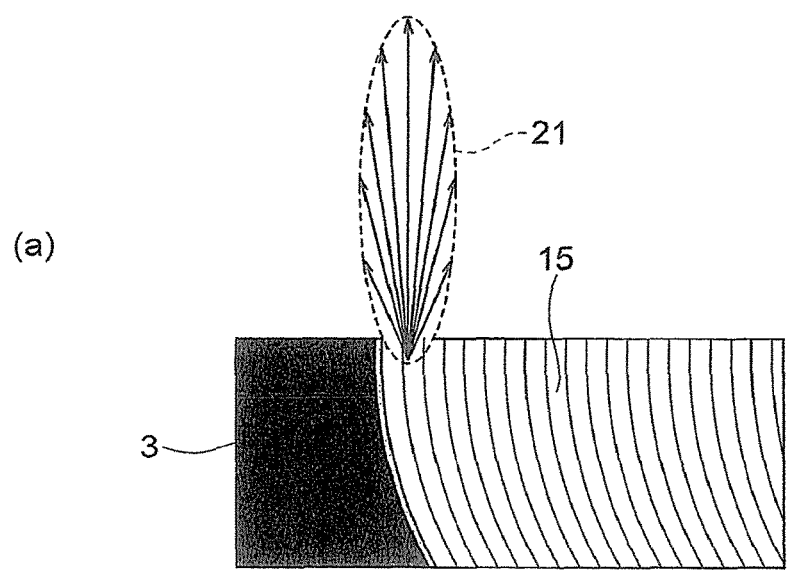
(b) 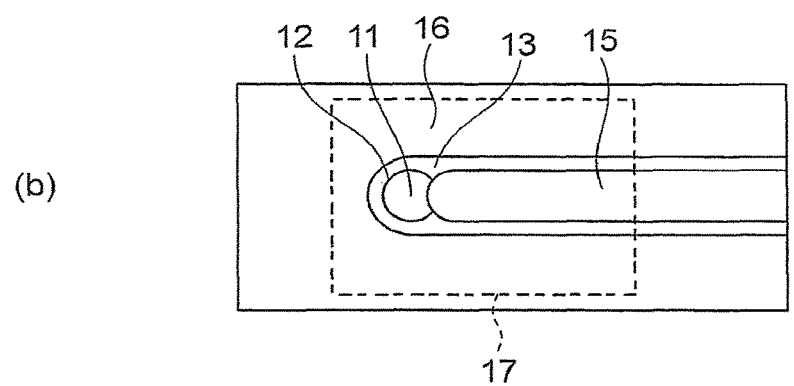

LASER PROCESSING HEAD APPARATUS WITH CAMERA MONITOR

TECHNICAL FIELD

This invention relates to a laser processing head apparatus with a camera monitor, which collects a laser beam for processing to a processing point of a processing material and performs laser processing, and images the state of the processing point and peripheral area thereof by using a camera.

BACKGROUND ART

In laser processing, it is critical to observe an image of a processing point and the peripheral area thereof in real-time in terms of explicating the processing phenomena, monitoring the processing quality and performing adaptive control of processing, therefore the potential demands for real-time observation is high.

Conventionally a laser processing head apparatus with a camera monitor, configured to irradiate a laser beam, which is deflected at a right angle by a beam splitter, onto a processing point of a processing material, and image the processing point and a peripheral area thereof using a camera, which is disposed on the rear face side of the beam splitter and on the same axis as the laser beam directed to the processing material, is known (e.g. see PTL 1).

In this apparatus, an illumination head, configured to emit light from a high brightness pulsed light source onto a processing point on a surface of a processing material, is disposed at a minimum of two locations next to the camera. From these illumination heads, processing point-emitted light including plasma generated by the laser processing, and short-pulsed laser illumination light having a brightness higher than a processing point-reflected laser beam, are actively irradiated onto the processing point, then this portion is viewed from directly above using the camera, and the processing point and the peripheral area thereof are imaged and observed.

CITATION LIST

Patent Literature

[PTL 1]
Japanese Patent Application Publication No. 2001-287064

SUMMARY OF INVENTION

Technical Problem

In this apparatus, however, a strong black-body radiation-like light emission is observed in a wide wavelength range from visible light to near-infrared region in the above mentioned processing point-emitted light, and the intensity is particularly high when the processing point-emitted light is in the visible light region, hence the peak intensity of the illumination light required for imaging in the visible light region becomes high.

Therefore an expensive pulsed laser beam must be used as the light source for illumination, which is a problem.

Further, in the case of this apparatus, which uses a pulsed laser beam for the illumination light source, the imaging using the camera must be executed synchronizing with the pulse of the illumination light source. This makes system control complicated, and it is inevitable that the mutual selection of the illumination light source and the camera is restricted.

Furthermore, the processing point-emitted light and the processing point-reflected laser beam may cause strong halation at the processing point, making it difficult to recognize the processing point and the peripheral area thereof in the image.

With the foregoing in view, it is an object of the present invention to provide a laser processing head apparatus with a camera monitor, which, for instance, is low cost and can image the state of a processing point and a peripheral area thereof while reducing the influence of halation.

Solution to Problem

A laser processing head apparatus with a camera according to the present invention has: a laser beam reflection mirror that reflects and deflects a laser beam for processing; a condensing lens that collects a reflected laser beam for processing, which has been reflected by the laser beam reflection mirror, to a processing point of a processing material; a camera that is disposed on an opposite side of the laser beam reflection mirror to the condensing lens and on the same axis as an optical axis of the reflected laser beam for processing; an imaging optical system that is disposed between the camera and the laser beam reflection mirror and on the same axis as the optical axis of the reflected laser beam for processing; an illumination optical system that is disposed on an imaging optical system side of the laser beam reflection mirror; a light source for illumination that generates illumination light which passes through the illumination optical system and the laser beam reflection mirror and irradiates the processing point; and an optical filter that is disposed on a laser beam reflection mirror side of the imaging optical system, wherein the reflected laser beam for processing generates processing point-emitted light including plasma by irradiating the processing point, is reflected at the processing point, and becomes a processing point-reflected laser beam, and the illumination light is reflected at the processing point and becomes illumination light for imaging, the light source for illumination includes a near-infrared laser diode that generates a near-infrared laser beam of which upper limit value is a wavelength of the laser beam for processing, and out of the processing point-emitted light, the processing point-reflected laser beam and the illumination light for imaging, which have passed through the condensing lens and the laser beam reflection mirror and is was directed to the camera respectively, the optical filter blocks transmission of the processing point-emitted light and the processing point-reflected laser beam, and transmits the illumination light for imaging.

Advantageous Effects of Invention

According to the laser processing head apparatus with a camera monitor, the state of the processing point and the peripheral area thereof is imaged using an infrared laser beam generated from the light source for illumination which includes a near-infrared laser diode, and entry of the processing point-emitted light and the processing point-reflected laser beam directed to the camera is blocked by the optical filter, hence the state of the processing point and the peripheral area thereof can be imaged at low cost and with less influence of halation.

Further, the imaging optical system and the illumination optical system are disposed on the opposite side of the laser beam reflection mirror to the condensing lens, and are not disposed between the condensing lens and the processing material, hence the laser processing head apparatus becomes compact, and contamination of the imaging optical system and the illumination optical system, caused by sputtering and the like, can be prevented.

BRIEF DESCRIPTION OF DRAWINGS

FIG. 3A is a cross-sectional view of laser welding of the processing material, and FIG. 3B is a top view of FIG. 3A.

FIG. 4A is a cross-sectional view of laser cutting of the processing material, and FIG. 4B is a top view of FIG. 4A.

DESCRIPTION OF EMBODIMENTS

A laser processing head apparatus with a camera monitor according to each embodiment of the present invention will now be described. In each drawing, a same or an equivalent member or a component is denoted with a same reference sign.

[Embodiment 1]

Figure 1:
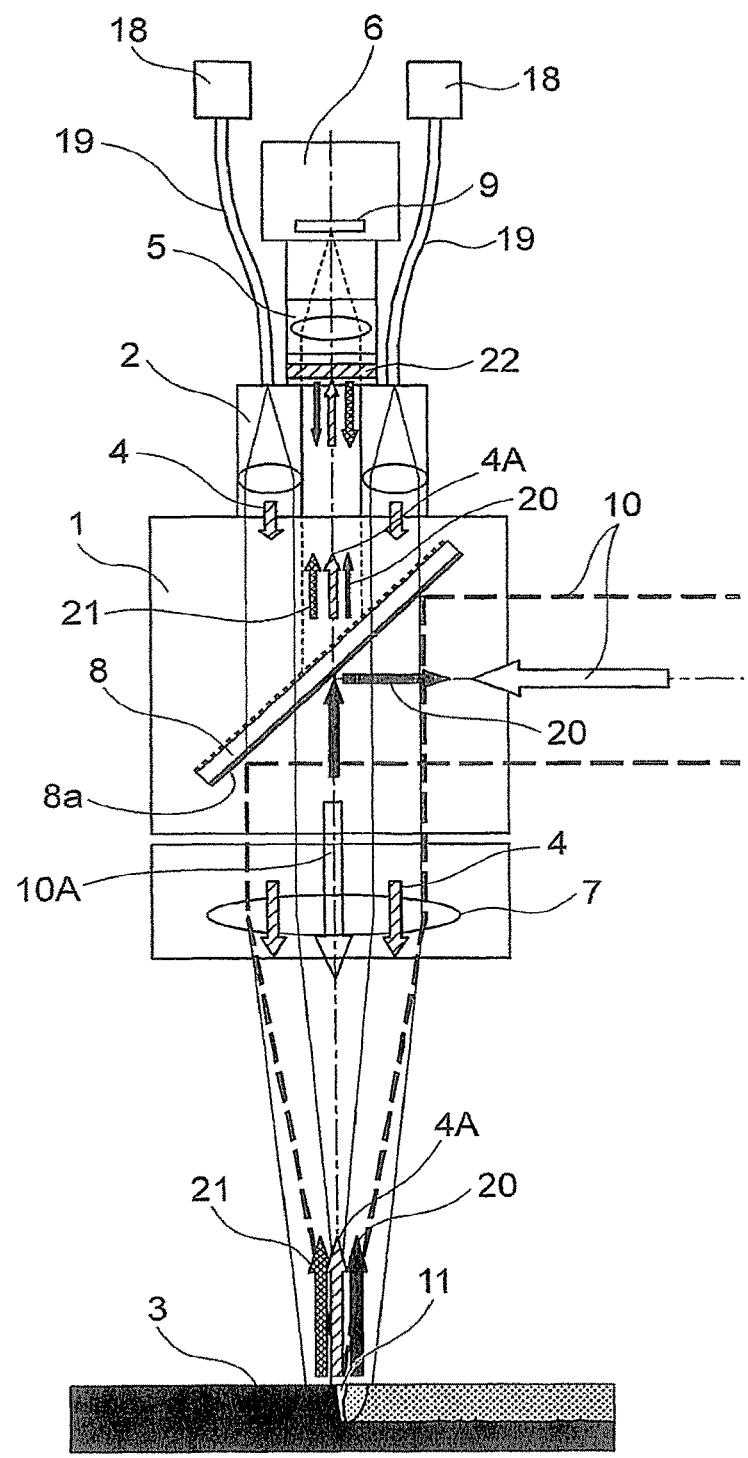
FIG. 1 is a schematic diagram depicting a laser processing head apparatus with a CMOS camera monitor according to Embodiment 1 of the present invention.

FIG. 1 is a schematic diagram depicting a laser processing head apparatus with a camera monitor (hereafter called "laser processing head apparatus") according to Embodiment 1 of the present invention.

The laser processing head apparatus has: a processing head main unit 1 which is disposed directly above a processing material 3; an illumination optical system 2 which is disposed on the opposite side of the processing head main unit 1 to the processing material 3 and through which illumination light 4 for illuminating the processing material 3 passes; an imaging optical system 5 which is disposed on the opposite side of the processing material 3 with respect to the illumination optical system 2; and a CMOS (Complementary Metal Oxide Semiconductor) camera (hereafter called "camera") 6 which is disposed on the opposite side of the illumination optical system 2 with respect to the imaging optical system 5.

The processing head main unit 1 includes a condensing lens 7 and a laser beam reflection mirror 8, which is disposed on the illumination optical system 2 side with respect to the condensing lens 7.

Figure 2:
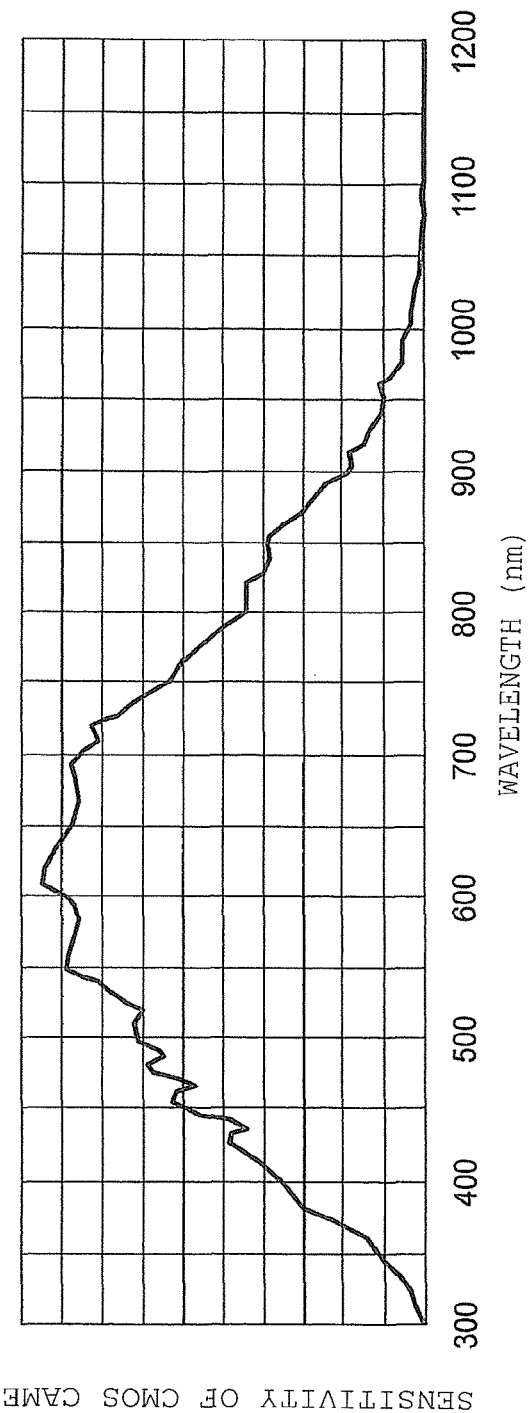
FIG. 2 is a characteristic diagram depicting a spectral sensitivity characteristic of the CMOS camera in FIG. 1.

The camera 6 is a silicon semiconductor and has a spectral sensitivity characteristic shown in FIG. 2, where the peak is in red and the sensitivity is observed in visible light to 1100 nm near-infrared, and an image is formed on an imaging plane 9 of the camera 6.

In the laser processing head apparatus, a laser beam for processing 10 that enters the laser beam reflection mirror 8 is deflected at a right angle and is reflected totally on a surface 8a of the laser beam reflection mirror 8, as shown by the arrow mark at the right side of FIG. 1, and is collected to the processing material 3 via the condensing lens 7.

The laser beam for processing 10 is generated by a solid-state laser or fiber laser, of which wavelength is around 1000 nm to 1100 nm.

For the laser beam for processing 10, for instance, a near-infrared laser diode (LD) of which wavelength is 800 nm to 1100 nm or a $CO_2$ laser of which wavelength is 10 μm may be used.

FIG. 3A is a cross-sectional view when the processing material 3 is laser-welded, FIG. 3B is a top view of FIG. 3A, FIG. 4A is a cross-sectional view when the processing material 3 is laser-cut, and FIG. 4B is a top view of FIG. 4A thereof.

In an imaging region 17 which is a peripheral area of a processing point 11 where light is collected on the processing material 3, a processing hole 12 and a welding pool 13 are formed. In the case of laser welding, a weld bead 14 is formed, and in the case of laser cutting, a cutting groove 15 is formed.

The processing hole 12, the welding pool 13, the weld bead 14 and the cutting groove 15 in the imaging region 17, formed on the surface 16 of the processing material 3, are imaged by the camera 6, which is disposed on the opposite side of the condensing lens 7 with respect to the laser beam reflection mirror 8, and on the same axis as the optical axis of a reflected laser beam for processing 10A, which was reflected totally by the laser beam reflection mirror 8.

An irradiation beam diameter of the laser beam for processing 10 is 0.1 mm to 1 mm, a width of the weld bead 14 is about 0.1 mm to 3 mm, and the imaging region 17 is about 1 mm to 20 mm vertically and horizontally.

The imaging optical system 5 responds to the changes of the imaging range and a focal length of the condensing lens 7 of the processing head main unit 1, hence the imaging optical system 5 may include a zoom function of which magnification is variable.

In this laser processing head apparatus, an image of the processing point 11 and the peripheral area thereof in the imaging region 17, generated by the illumination light 4, is formed on the CMOS camera imaging plane 9 via the imaging optical system 5 and the condensing lens 7.

The illumination light 4, generated by a light source for illumination 18, is transmitted to the illumination optical system 2 via a transmission fiber 19.

The light source for illumination 18 has a near-infrared laser diode (LD) which continuously oscillates in the near-infrared region of which wavelength is 700 nm to 1000 nm.

The illumination light 4 passes through the transmission fiber 19 is processed by the illumination optical system 2 so that the divergence angle is reduced, and then illuminates the processing point 11 and the peripheral area thereof in the imaging region 17 via the laser beam reflection mirror 8 and the condensing lens 7.

The optical axis of the illumination light 4 is disposed approximately in parallel with the optical axis of the reflected laser beam for processing 10A, and passes through the focal position of the condensing lens 7, regardless the displacement amount in the diameter direction. Therefore the illumination light 4 is irradiated centering around the processing point 11, which is the focal position of the condensing lens 7.

The reflected laser beam for processing 10A, which is irradiated onto the processing point 11 and reflected at the processing point, becomes a processing point-reflected laser beam 20, and linearly advances to the laser beam reflection mirror 8.

At the processing point 11 irradiated by the reflected laser beam for processing 10A, processing point-emitted light 21 including plasma is generated.

Figure 5:
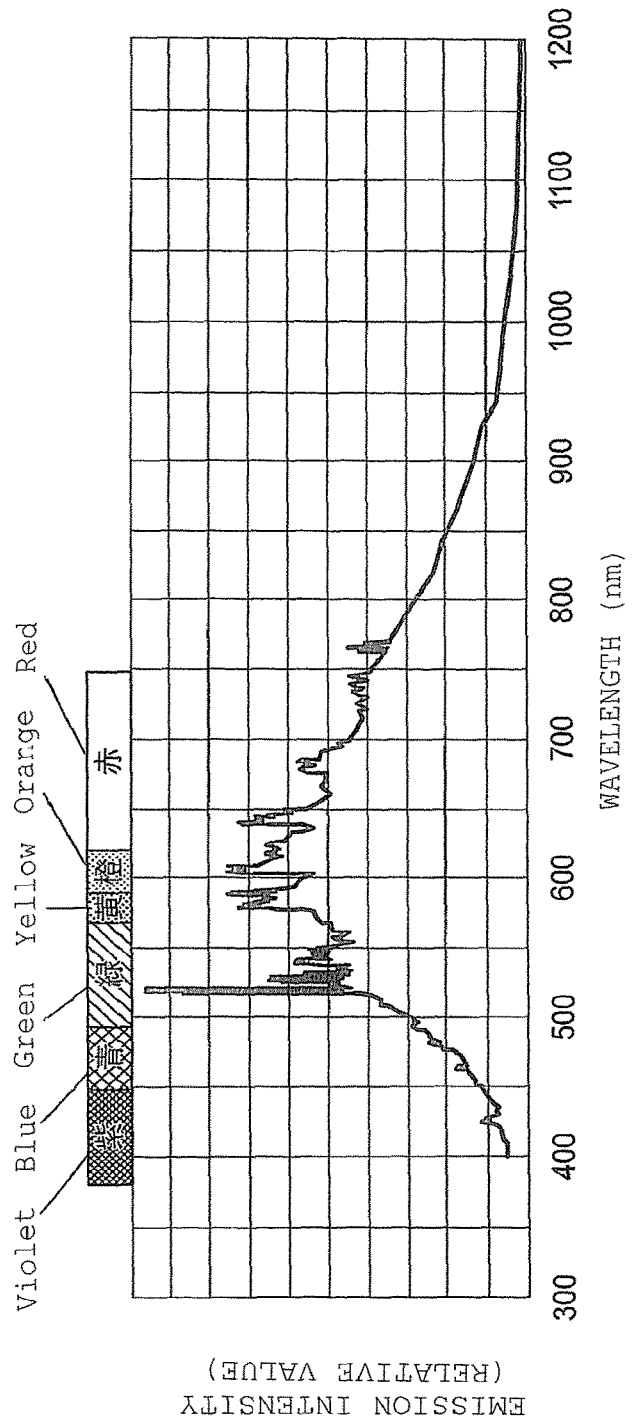
FIG. 5 is a spectral distribution diagram depicting processing point-emitted light.

FIG. 5 shows an emission spectrum of the processing point-emitted light 21 in this case, and, as shown in FIG. 5, a strong black-body radiation-like light emission is observed throughout a wide wavelength range in visible light to a near-infrared region.

The illumination light 4, which is irradiated onto the processing point 11 and then reflected, becomes illumination light for imaging 4A, and advances linearly to the laser beam reflection mirror 8.

Figure 6:
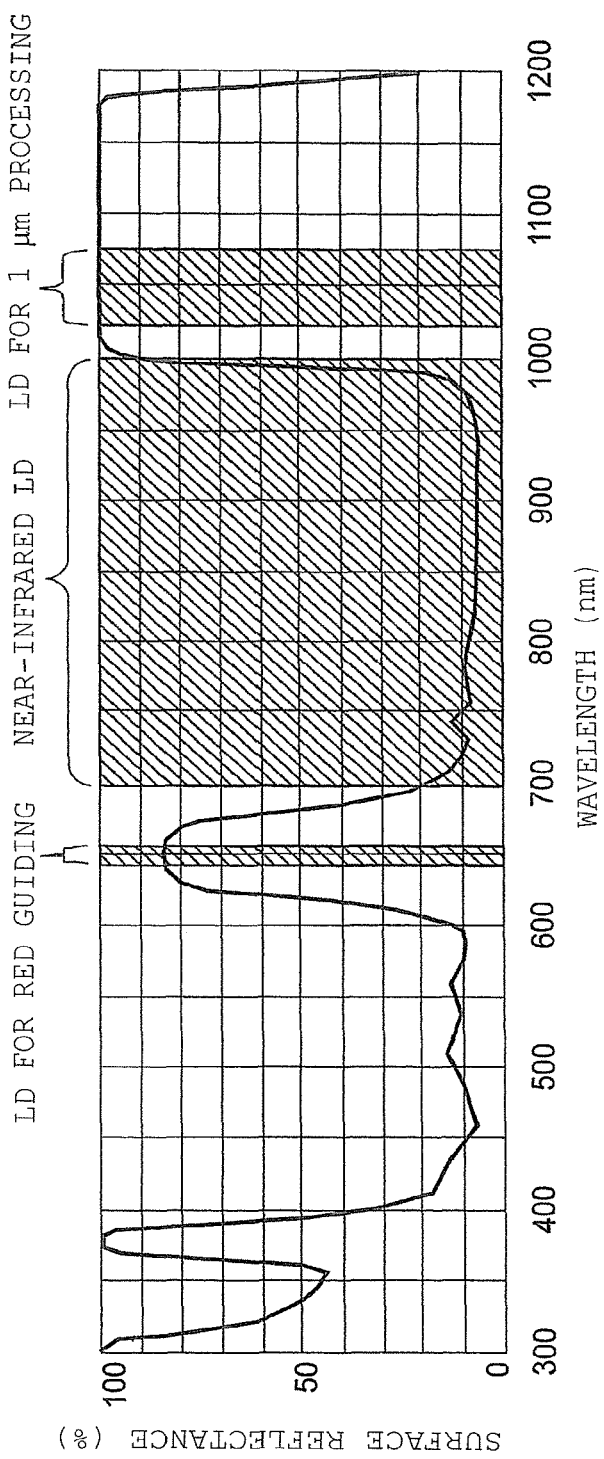
FIG. 6 is a characteristic diagram depicting a reflection characteristic of the laser beam reflection mirror in FIG. 1.

As shown in FIG. 6, an optical coating is formed on the surface 8a of the laser beam reflection mirror 8 so that 99% or more of the processing point-reflected laser beam 20 of which wavelength is 1030 nm to 1070 nm is reflected, 50% or more of the red laser beam for guiding, of which wavelength is about 650 nm and which is superimposed on the processing point-reflected laser beam 20, is reflected, and 80% or more of the illumination light for imaging and imaging 4A, of which wavelength is 700 nm to 1000 nm in the infrared range, is transmitted.

An anti-reflection coating, which has a low loss characteristic with respect to the light in an ultraviolet to near-infrared region, may be formed on the rear face of the laser beam reflection mirror 8, in order to increase the transmissivity of the illumination light for imaging 4A, which is imaging light.

An optical filter 22 that transmits the illumination light for imaging 4A and blocks transmission of the processing point-reflected laser beam 20 and the processing point-emitted light 21 is disposed on the front face of the imaging optical system 5.

According to the above mentioned laser processing head apparatus, a near-infrared laser diode (LD), that generates a near-infrared laser beam, of which wave length is any value in a 700 nm to 1000 nm range, is used for the light source for illumination 18, and this value is shorter than the wavelength range of the laser beam for processing 10, which is 1030 nm to 1070 nm.

The camera 6 is a CMOS camera 6 having a sensitivity in visible light to 1100 nm near-infrared region, as shown in FIG. 2, and this camera 6 images the imaging region 17 on the surface 16 of the processing material 3 irradiated by the illumination light 4, of which wavelength is in a 700 nm to 1000 nm infrared range, which is different from the above mentioned wavelength range of the laser beam for processing 10. As a consequence, for the light source for illumination 18 to generate the illumination light 4, pulse oscillation to secure brightness is not essential, and an inexpensive near-infrared laser diode (LD), which oscillates continuously, can be used. Further, it is unnecessary to synchronize the camera 6 for imaging with the light source for illumination 18, hence the setting range of the imaging conditions (e.g. frame rate, exposure time) widens dramatically, and an image of the processing point 11, having excellent brightness and contrast, can be acquired.

Moreover, system control is simplified, and mutual selection of the light source for illumination 18 and the camera 6 is not restricted by compatibility issues.

An optical coating is formed on the surface 8a of the laser beam reflection mirror 8, so that 99% or more of the processing point-reflected laser beam 20, which is a factor to interrupt imaging of the processing point 11, is reflected, 50% or more of the red laser beam for guiding, of which wavelength is about 650 nm and which is superimposed on the processing point-reflected laser beam 20, is reflected, and 80% or more of the illumination light for imaging 4A, of which wavelength is 700 nm to 1000 nm in the infrared range, is transmitted, and furthermore, the processing point-emitted light 21 and the processing point-reflected laser beam 20, which are major interrupts to imaging of the processing point 9, are blocked by the optical filter 22.

As a result, the generation of halation from the image monitor is reduced, and an image, in which the drop in contrast due to general noise light has decreased dramatically, can be recognized.

This means that in the laser processing, the processing hole 12, the welding pool 13, the weld bead 14 and the cutting groove 15, which are formed on the surface 16 of the imaging region 17 of the processing material 3, can be imaged clearly. The camera 6 is disposed on the rear face side of the laser beam reflection mirror 8 and on the same axis as the reflected laser beam for processing 10A, which was totally reflected by the laser beam reflection mirror 8, hence inside the processing hole 12 and the cutting groove 15 can be observed well.

Further, the illumination optical system 2 and the imaging optical system 5 are disposed on the opposite side of the condensing lens 7 with respect to the laser beam reflection mirror 8, hence a laser processing head apparatus, of which distance between the condensing lens 7 and the processing material 3 is short, can be implemented, and contamination of the illumination optical system 2 and the imaging optical system 5, caused by sputtering and the like, can be prevented.

[Embodiment 2]

Figure 7:
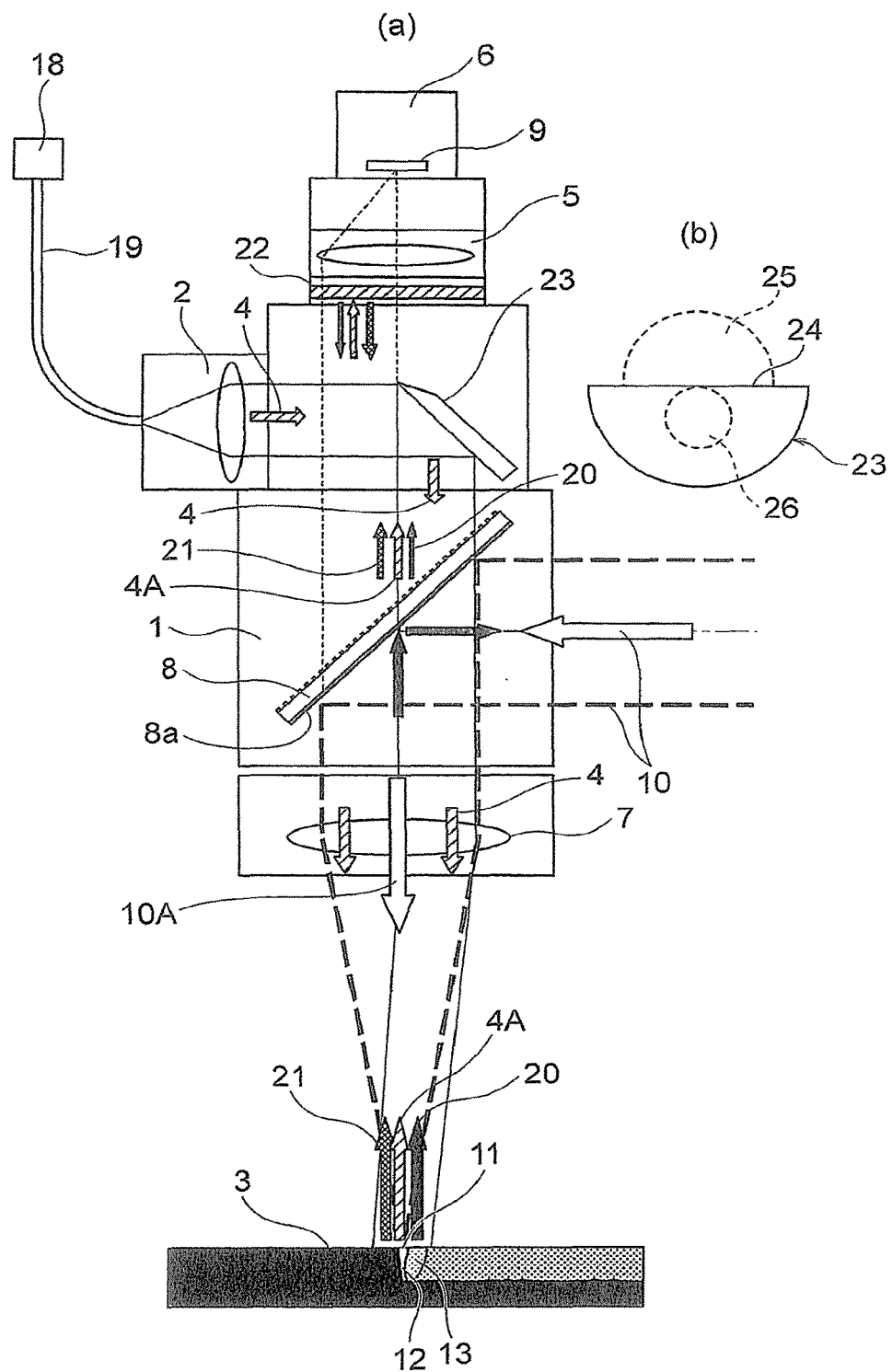
FIG. 7A is a schematic diagram depicting a laser processing head apparatus with a CMOS camera monitor according to Embodiment 2 of the present invention.
FIG. 7B is a top view of the illumination light reflection mirror of FIG. 7A.

FIG. 7A is a schematic diagram depicting a laser processing head apparatus according to Embodiment 2 of the present invention, and FIG. 7B is a top view of an illumination light reflection mirror 23 of FIG. 7A.

In Embodiment 2, the illumination light reflection mirror 23 that totally reflects the illumination light 4, which is an infrared laser beam generated by the light source for illumination 18, is disposed on a part of the imaging optical path between the camera 6 and the laser beam reflection mirror 8. The illumination light 4, which is reflected totally by the semi-circular-shaped illumination light reflection mirror 23, illuminates the processing point 11. The surface of the illumination light reflection mirror 23 is a metal surface that totally reflects the illumination light 4.

The illumination optical system 2 is disposed inclined in the diameter direction from the projection surface of the imaging optical system 5.

The rest of the configuration is the same as the laser processing head apparatus of Embodiment 1.

According to the laser processing head apparatus of Embodiment 2, the illumination light 17 directed to the illumination light reflection mirror 23 can be disposed to contact the edge 26 of the illumination light reflection mirror 23, therefore the upper half of the illumination light reflection mirror 23 shown in FIG. 7B becomes the imaging region 25, and the lower half becomes the illumination light reflection region 26.

In this way, the left half from the center of the laser beam reflection mirror 8 in FIG. 7A becomes the imaging optical path, and the right half thereof becomes the illumination optical path, whereby wasteful gaps between the imaging optical path and the illumination optical path are eliminated, the illumination light 4 having sufficient light quantity required for imaging can be secured without reducing the aperture of the imaging optical path very much, and a clear image of the processing point 11 can be acquired.

Further, the illumination optical system 2 is outside the imaging optical path, hence even if the size of the illumination optical system 2 is large in the optical axis direction and the diameter direction, it is unnecessary to increase the distance between the camera 6 and the laser beam reflection mirror 8, and a laser processing head apparatus, in which the length of the reflected laser beam for processing 10A in the optical axis direction is short, can be implemented. If a small beam diameter of the illumination light 4 on the illumination light reflection mirror 23 is implemented by the illumination optical system 2, the area of the illumination light reflection mirror 23 can be decreased and the cross-section of the imaging optical path can be increased, whereby a clearer image can be acquired using more light quantity of the illumination light for imaging 4A.

In this embodiment, the LD illumination light reflection mirror 23 has a metal surface, hence compared with the partial reflection mirror constituted by a dielectric substrate (e.g. glass) and dielectric multilayer film (that is, a reflection mirror of which the entire reflection surface has a uniform partial transmittance), multiple reflection and scattering of the illumination light 4 can be prevented, and a clear image having excellent contrast can be acquired.

[Embodiment 3]

Figure 8:
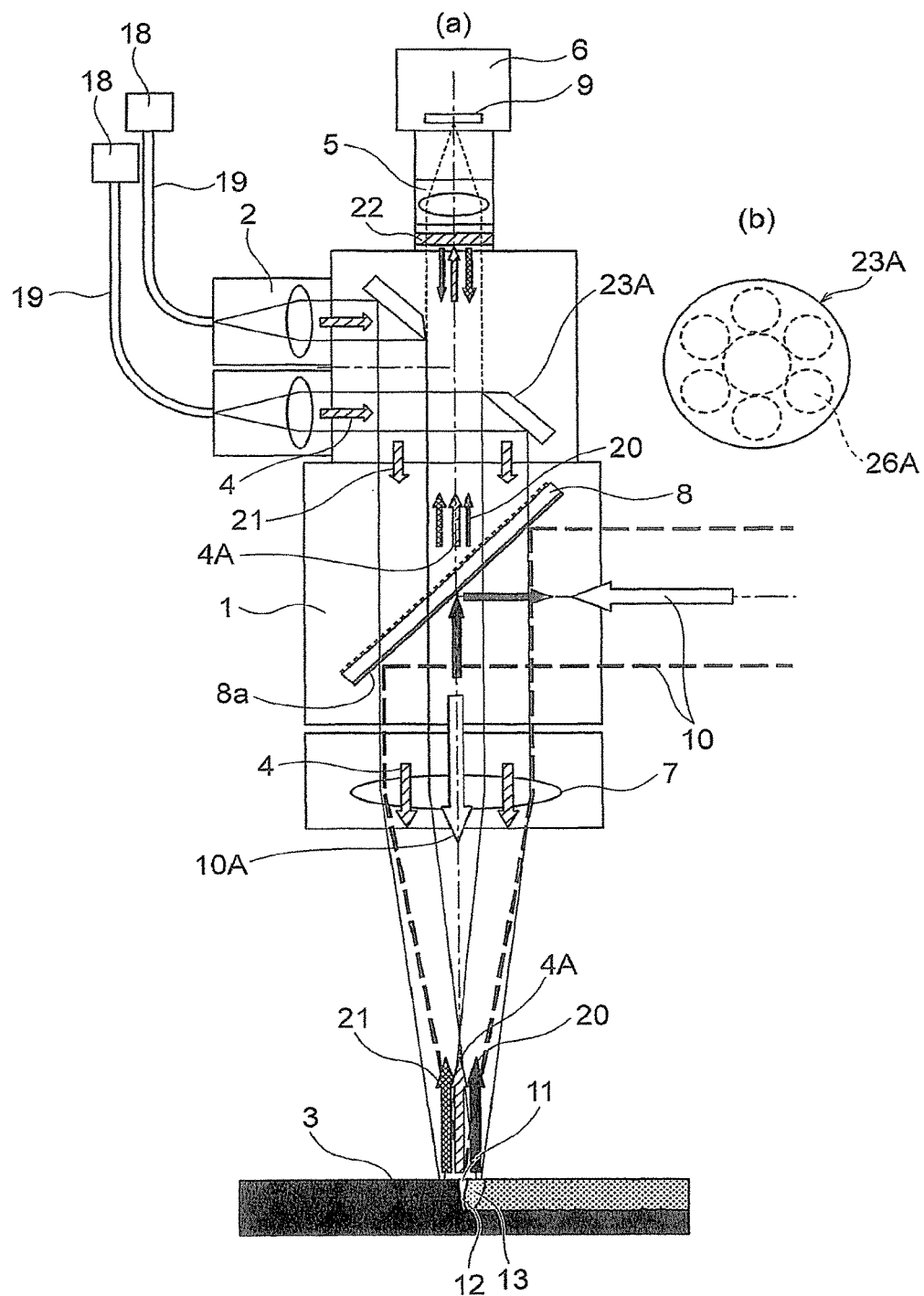
FIG. 8A is a schematic diagram depicting a laser processing head apparatus with a CMOS camera monitor according to Embodiment 3 of the present invention.
FIG. 8B is a top view of the illumination light reflection mirror of FIG. 8B.

FIG. 8A is a schematic diagram depicting a laser processing head apparatus according to Embodiment 3 of the present invention, and FIG. 8B is a top view of an illumination light reflection mirror 23A of FIG. 8A.

In Embodiment 3, the illumination light reflection mirror 23A has an annular shape with an opening at the center, and a plurality of illumination light rays 4 form a plurality of independent illumination light reflection regions 26A on the surface of this illumination light reflection mirror 23A at equal intervals respectively in the circumferential direction. Furthermore, a plurality of light sources for illumination 18, transmission fibers 19 and illumination optical systems 2 are disposed corresponding to each illumination light 4 respectively.

The rest of the configuration is the same as the laser processing head apparatus of Embodiment 2.

According to the laser processing head apparatus of Embodiment 3, many light sources for illumination 18 to emit illumination light rays 4 can be disposed on the illumination light reflection mirror 23A, hence compared with a single illumination light 4, light quantity of illumination light that is irradiated onto the illumination light reflection mirror 23A and light quantity of the light that is reflected, can be increased respectively, and brighter and clearer imaging can be performed.

Particularly in imaging using the camera 6, the imaging time is limited to be shorter than imaging at a normal frame rate, therefore it is important to secure the illumination light quantity, which is a major effect of Embodiment 3.

Further, the optical axis of the illumination light 4 around the processing point 11 is slightly inclined from the optical axis of the laser beam for processing 10, and if a single illumination light 4 is used, a shadow of the illumination light 4 penetrates part of the approximately vertical inner wall of the processing hole 12.

In Embodiment 3, however, the entire processing hole 12 is illuminated by many illumination light rays 4 from all around the processing hole 12, hence the entire inner wall of the processing hole 12 can be illuminated, and the inner part of the processing hole 12 can be clearly imaged.

The state of the laser processing is determined by the processing hole 12 formed by the irradiation of the laser beam for processing 10 and the welding pool 13 formed by heating of the processing hole 12, therefore understanding the state of the processing hole 12 and the inner part thereof is extremely critical to understand the laser processing state, and the effect of Embodiment 3 which allows close observation inside the processing hole 12 is significant.

[Embodiment 4]

Figure 9:
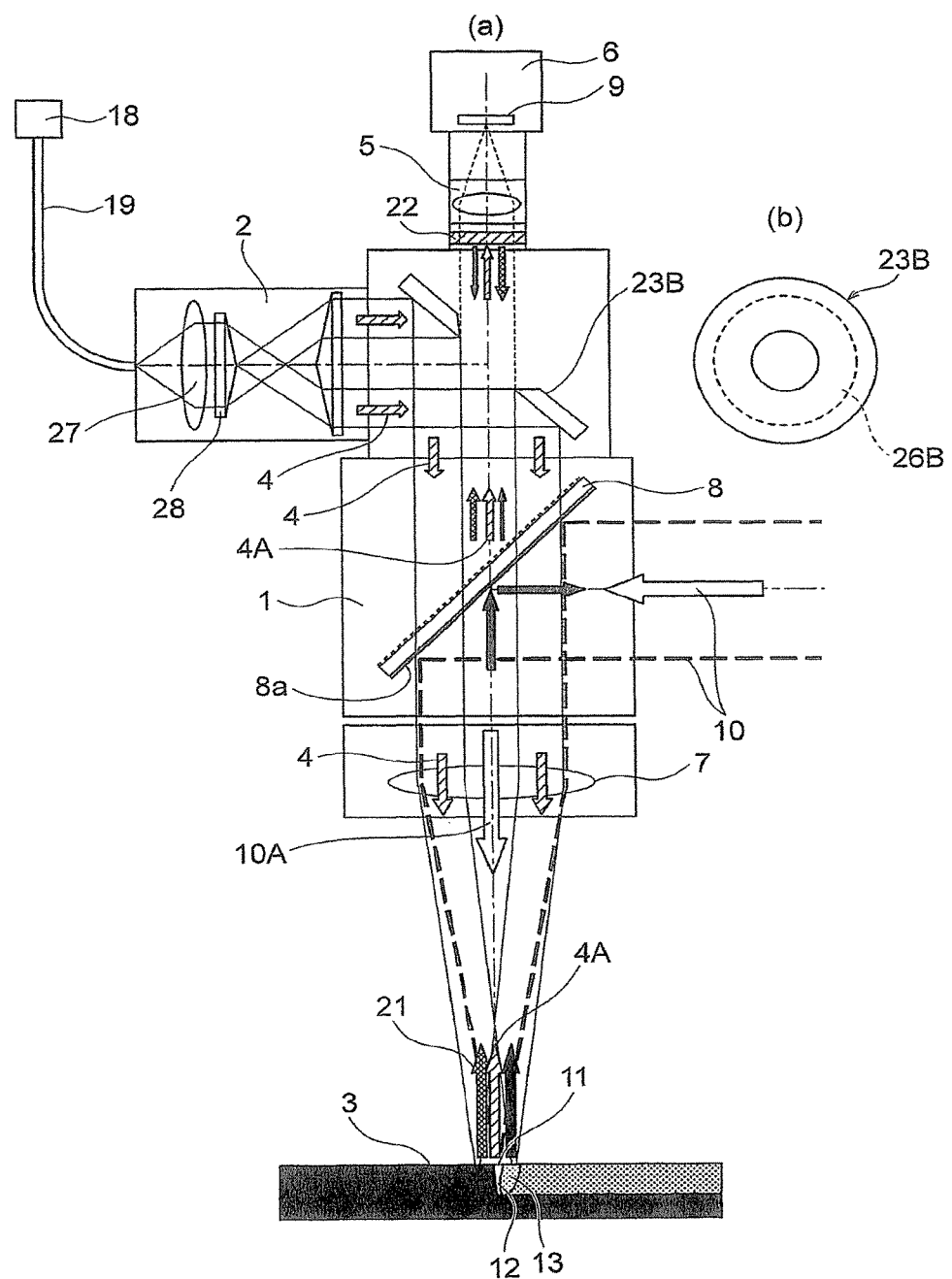
FIG. 9A is a schematic diagram depicting a laser processing head apparatus with a CMOS camera monitor according to Embodiment 4 of the present invention.
FIG. 9B is a top view of the illumination light reflection mirror of FIG. 9A.

FIG. 9A is a schematic diagram depicting a laser processing head apparatus according to Embodiment 4 of the present invention, and FIG. 9B is a top view of an illumination light reflection mirror 23B of FIG. 9A.

In Embodiment 4, the illumination light reflection mirror 23B has an annular shape with an opening at the center, and an illumination light reflection region 26B, to which annular illumination light 4 is irradiated, is formed on the surface of this illumination light reflection mirror 23B.

The annular illumination light 4 is collimated by a convex lens 27 of the illumination optical system 2, and passes through a pair of convex axicon lenses 28 which face each other, whereby this collimated annular illumination light 4, having a hollow cone shape, is formed.

The rest of the configuration is the same as the laser processing head apparatus of Embodiment 2.

According to the laser processing head apparatus of Embodiment 4, the annular illumination light 4 is disposed on the surface of the annular illumination light reflection mirror 23B, and the processing point 11 and the peripheral area thereof in the imaging region 17 are isotropically illuminated with the optical axis as the center, hence image unevenness can be reduced. Moreover, the processing point 11 and the peripheral area thereof are illuminated from all around the processing hole 12, which is approximately vertical to the surface 16 of the processing material 3, hence no shadow is generated on the inner wall of the processing hole 12, the illumination light 4 reaches the inner part of the processing hole 12, and the inside of the processing hole 12 can be clearly imaged as well. Furthermore, the annular illumination light 4 is formed by the single light source for illumination 18, the transmission fiber 19, the convex lens 27 and the pair of axicon lenses 28, therefore the light from the light source for illumination 18 can be converted into an annular beam without loss, and an illumination light 4, that has no distribution in the circumferential direction, can be formed.

Thereby the processing point 11 is imaged clearly without illumination unevenness and shadow.

Further, the light source for illumination 18, the transmission fiber 19 and the illumination optical system 2 can be implemented as a single unit respectively.

Further, when the annular illumination light 4 is formed, a transmission fiber, where the laser beam propagates spirally, may be used.

If the entry of the laser beam to the transmission fiber is shifted from the center of the fiber and is slightly inclined in the circumferential direction with respect to the fiber axis, and the light propagates in the fiber spirally, and the annular beam is emitted from the outlet end.

If this transmission fiber is used, the pair of axicon lenses 28 is not needed, and the annular illumination beam can be formed by the collimate lens alone, which reduces cost.

[Embodiment 5]

Figure 10:
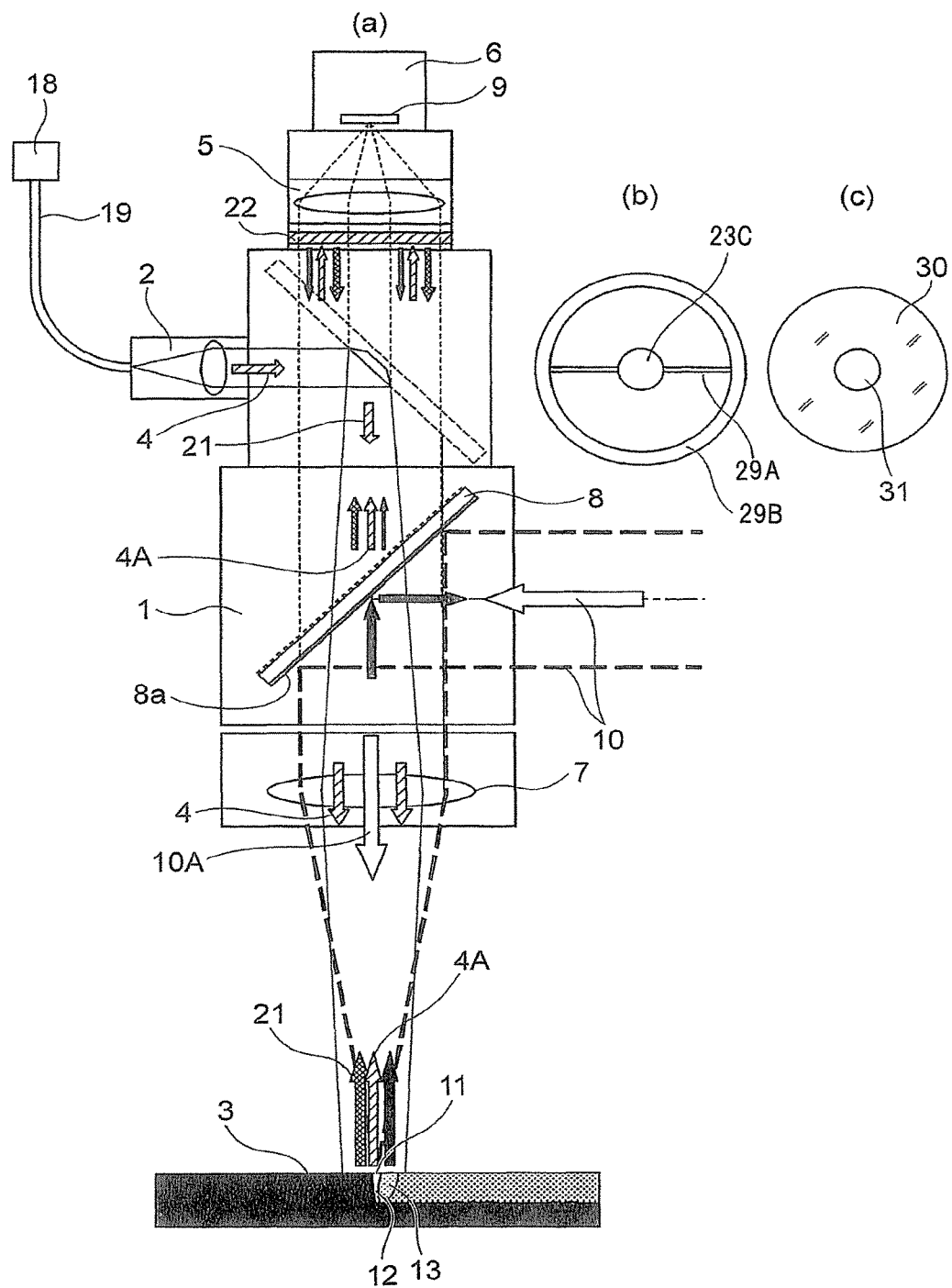
FIG. 10A is a schematic diagram depicting a laser processing head apparatus with a CMOS camera monitor according to Embodiment 5 of the present invention.
FIG. 10B is a top view of the illumination light reflection mirror of FIG. 10A.
FIG. 10C is a top view of a modification of the illumination light reflection mirror.

FIG. 10A is a schematic diagram depicting a laser processing head apparatus according to Embodiment 5 of the present invention, and FIG. 10B is a top view of an illumination light reflection mirror 23C of FIG. 10A.

In Embodiment 5, the illumination light reflection mirror 23C, which is supported by a mirror holder (not illustrated) via support members 29A and 29B, is disposed between the camera 6 and the laser beam reflection mirror 8. The peripheral area of the illumination light reflection mirror 23C becomes the illumination light reflection region, and the peripheral space of the illumination light reflection region forms an optical path space for imaging by the camera.

The rest of the configuration is the same as the laser processing head apparatus of Embodiment 2.

According to this laser processing head apparatus, the optical axis of the illumination light 4 can be precisely the same as the optical axis of the reflected laser beam for processing 10A, and the illumination light 4 can be irradiated from the front side of the processing point 11, hence compared with the laser processing head apparatuses of Embodiments 3 and 4, an even deeper part inside the processing hole 12 can be illuminated.

Thereby the state of a deep part of the processing hole 12 can be observed even if the processing hole 12 is small and deep. Further, if the illumination optical system 2 is adjusted to decrease the beam diameter of the illumination light 4 directed to the illumination light reflection mirror 23C, the diameter size of the illumination light reflection mirror 23C can be decreased, that is, the imaging aperture can be larger, whereby the light quantity of the illumination light for imaging 4A increases and a clearer image can be acquired. Furthermore, in Embodiment 5, the illumination light reflection mirror 23C reflects light on the metal surface, therefore compared with a semi-transmissive mirror constituted by a dielectric substrate (e.g. glass) and a dielectric multilayer film, multiple reflection and scattering of the illumination light can be prevented, and a clear image with excellent contrast can be acquired.

As shown in FIG. 10C, a circular metal plate 31 of total reflection may be adhered to the center of the surface of the dielectric substrate 30 (e.g. glass), which is transparent with respect to the illumination light 4. A total reflection coating may be formed on the center part of the surface of the dielectric substrate 30.

If the dielectric substrate 30 is used, the support members 29A and 29B is unnecessary, and the loss of light quantity for imaging, caused by the support members 29A and 29B, can be prevented, whereby a clearer image can be acquired.

[Embodiment 6]

Figure 11:
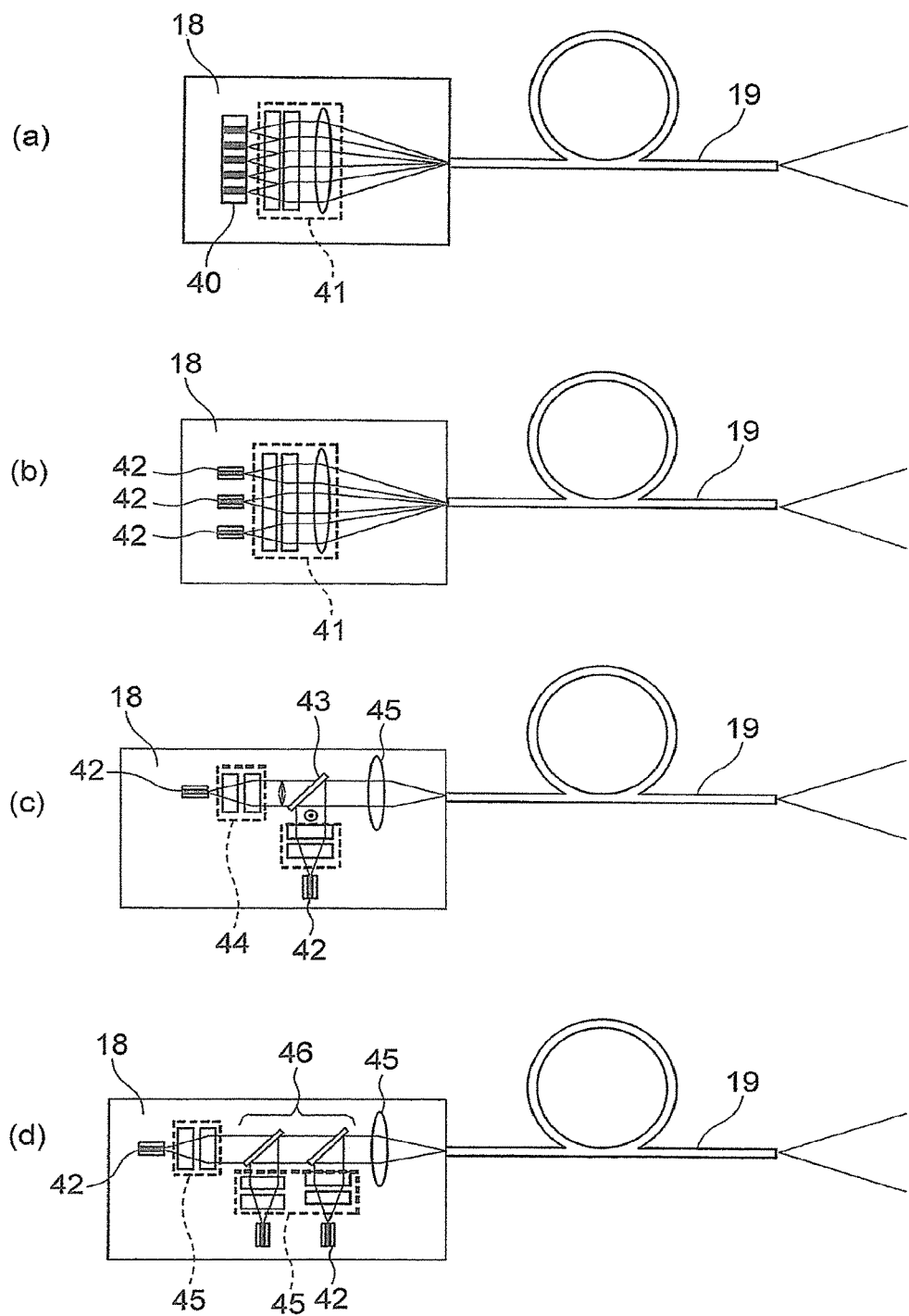
FIG. 11A to FIG. 11D are schematic diagrams depicting each light source for illumination of the laser processing head apparatus with a CMOS camera monitor according to Embodiment 6 of the present invention.

FIG. 11 are schematic diagrams depicting examples of a light source for illumination 18 of a laser processing head apparatus according to Embodiment 6 of the present invention. If an image is captured by a CMOS camera or the like, using a laser beam with high coherence as the light source for illumination, fine glare and speckles are generated in the captured image, whereby image quality drops.

It is true that if a light source of which spectral range is wide and coherence is very low, such as a conventional arc lamp and halogen lamp, is used, then speckles are not generated and a high quality image can be captured.

However, to reduce the halation of the processing point-emitted light, it is necessary to limit the spectral range and a 100 W or higher lamp output is needed, which makes the light source for illumination large.

Furthermore, the lamp has isotropic emission and no directivity, therefore it is difficult to efficiently emit lamp light from the rear surface of the laser beam reflection mirror (diameter: 70 mm or less) with a small spread angle.

In Embodiment 6, the light source for illumination 18 is constituted by a plurality of laser diodes (LD) of which emitted light rays are transmitted by fibers and mixed, hence coherence is low and speckles in the image decrease.

Moreover, unlike a simple superimposition of light in a space, the light rays are transmitted via the fibers and mixed, hence the light intensity at the outlet of the fiber is uniform and the mixing state of light from each LD emission point is also uniform, therefore the light intensity of the light source for illumination is uniform, and the degree of the remaining speckles after reduction is also uniform, and as a result, an ideal light source for illumination can be implemented.

FIG. 11A is an example when an LD bar 40, having a plurality of emission points, is optically coupled with a shaping and collecting optical system 41, and the oscillation wavelength range of each emission point is less than 1 nm, which is relatively small.

However an individual LD emission point is independent and has a different oscillation wavelength, and the phases of the LD emission points are not synchronized, hence the coherence of each emission point is lower and generates less speckles compared with an LD having a single emission point.

In this example, the connection of the shaping and collecting optical system 41 to the transmission fiber 19 is easy, and a single LD bar 40 is used as the LD device, hence the unit price per output is lower than those of FIG. 11B to FIG. 11D, to be described below.

FIG. 11B is an example when a plurality of LD chips 42 are optically coupled with a single transmission fiber 19.

Since an arbitrary wavelength can be selected for each LD chip 42, the wavelength interval can be set to 10 nm or more 200 nm or less, coherence can be decreased even more then the LD bar 40, and the generation of speckles can be suppressed greatly. Connection of the collecting optical system to the transmission fiber 19 is easy as in the case of the LD bar 40 in FIG. 11A, and the unit price per output is lower than those of FIG. 11C and FIG. 11D, to be described below.

FIG. 11C is an example when two LD chips 42 are polarized and coupled using a polarization beam splitter 43.

Only two LD chips 42 can be coupled and it is difficult to make the wavelength interval exceed 10 nm for the purpose of reducing loss of light quantity at the beam splitter 43, but the converging performance at coupling does not drop, and high convergence coupling of the light source with the fiber can be implemented.

By increasing the convergence of the light source for illumination 18, the illumination optical system 2 after light is emitted to the transmission fiber 19 can be downsized, and interruption of the imaging optical path between the camera 6 and the laser beam reflection mirror 8 by the illumination optical path can be reduced, whereby a bright image can be acquired.

In this example, an optical element that rotates the S polarization on one side (not illustrated) and the polarization beam splitter 43 are needed besides the shaping optical system 44 and the collecting optical system 45, so cost increases compared with the cases of FIG. 11A and FIG. 11B.

FIG. 11D is an example when a plurality of LD chips 42 are wavelength-coupled using dichroic mirrors 46. The cost slightly increases because a number of dichroic mirrors 46, corresponding to a number of LDs (wavelengths) to be coupled, are required, but an increased number of LD chips can be coupled without dropping the converging performance, hence a light source for illumination 18 having a much lower coherence can be implemented with high output and high convergence, and a bright and clear processing point image, with less speckles, can be imaged using a compact laser processing head apparatus.

[Embodiment 7]

Figure 12:
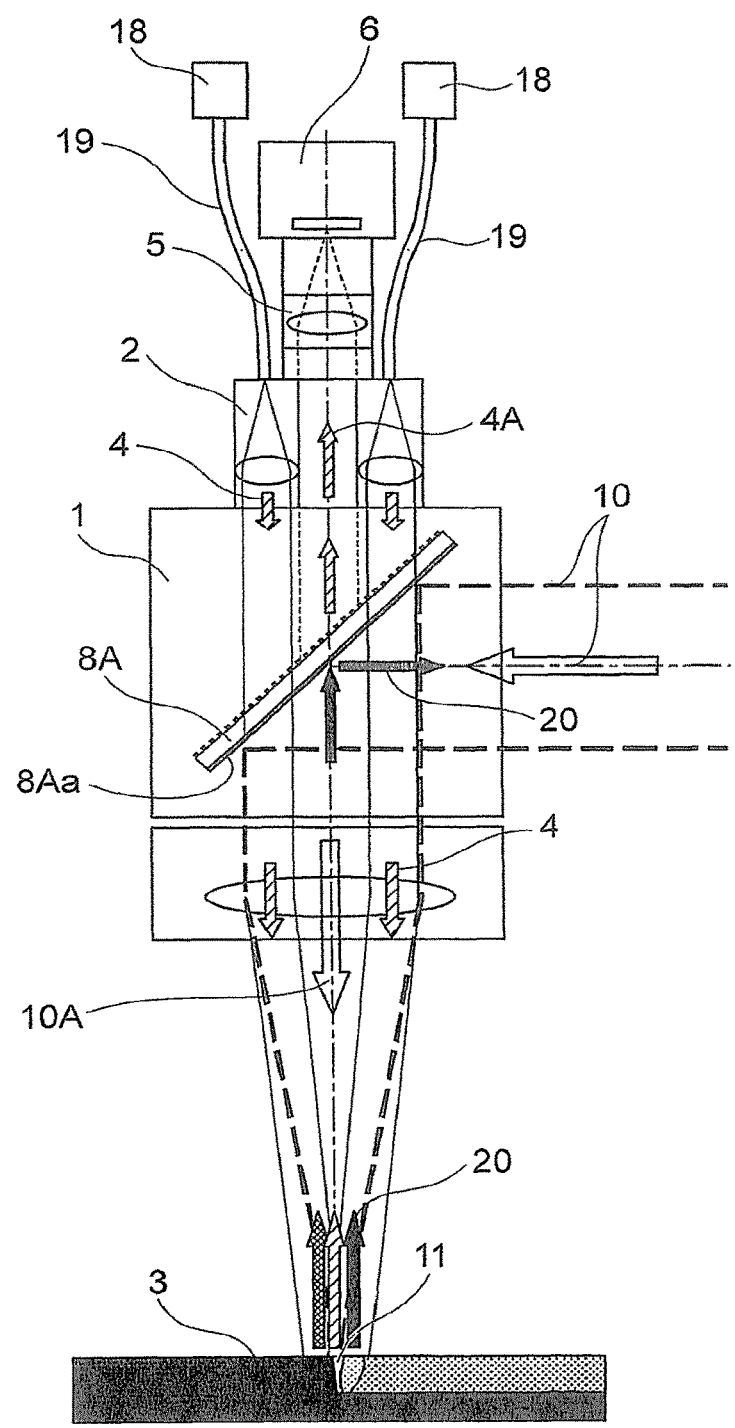
FIG. 12 is a schematic diagram depicting a laser processing head apparatus with a CMOS camera monitor according to Embodiment 7 of the present invention.
Figure 13:
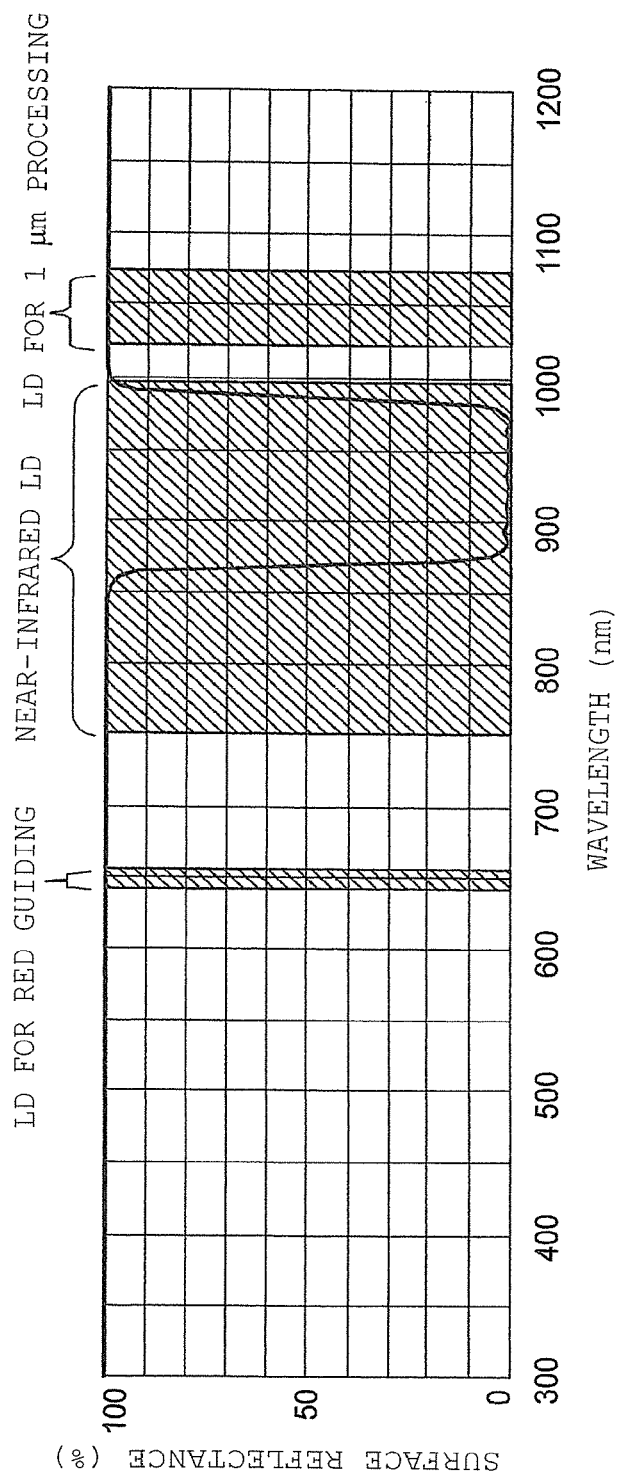
FIG. 13 is a characteristic diagram depicting the reflection characteristic of the laser beam reflection mirror in FIG. 12.

FIG. 12 is a schematic diagram depicting a laser processing head apparatus according to Embodiment 7 of the present invention, and FIG. 13 is a characteristic diagram depicting a spectral reflection characteristic of a laser beam reflection mirror 8 in FIG. 12.

In Embodiment 7, the surface 8Aa of the laser beam reflection mirror 8A reflects 99%.5 or more of the wavelength of the laser beam for processing 10, the wavelength region of the illumination light 4 has high transmission, and a short wavelength region, including the wavelength of the visible light of the illumination light 4, has high reflection, as shown in FIG. 13.

The optical filter 22 in Embodiments 1 to 6, separately disposed on the opposite side of the camera 6 with respect to the imaging optical system 5, is omitted.

The rest of the configuration is the same as the laser processing head apparatus of Embodiment 1.

According to this laser processing head apparatus of Embodiment 7, the laser beam reflection mirror 8A can block entry of the imaging noise light, such as the processing point-emitted light 21 in visible light to the infrared region, which causes strong halation, into the camera 6, out of the illumination light for imaging 4A that travels from an area near the processing point 11 to the camera 6 via the laser beam reflection mirror 8A, whereby a clear image can be acquired.

Further, the reflectance of the noise light by the laser beam reflection mirror 8A is 99% or more, and the optical filter 22 of Embodiment 1, separately disposed on the front side of the imaging optical system 5, is unnecessary, which reduces the size and cost of the laser processing head apparatus.

[Embodiment 8]

Figure 14:
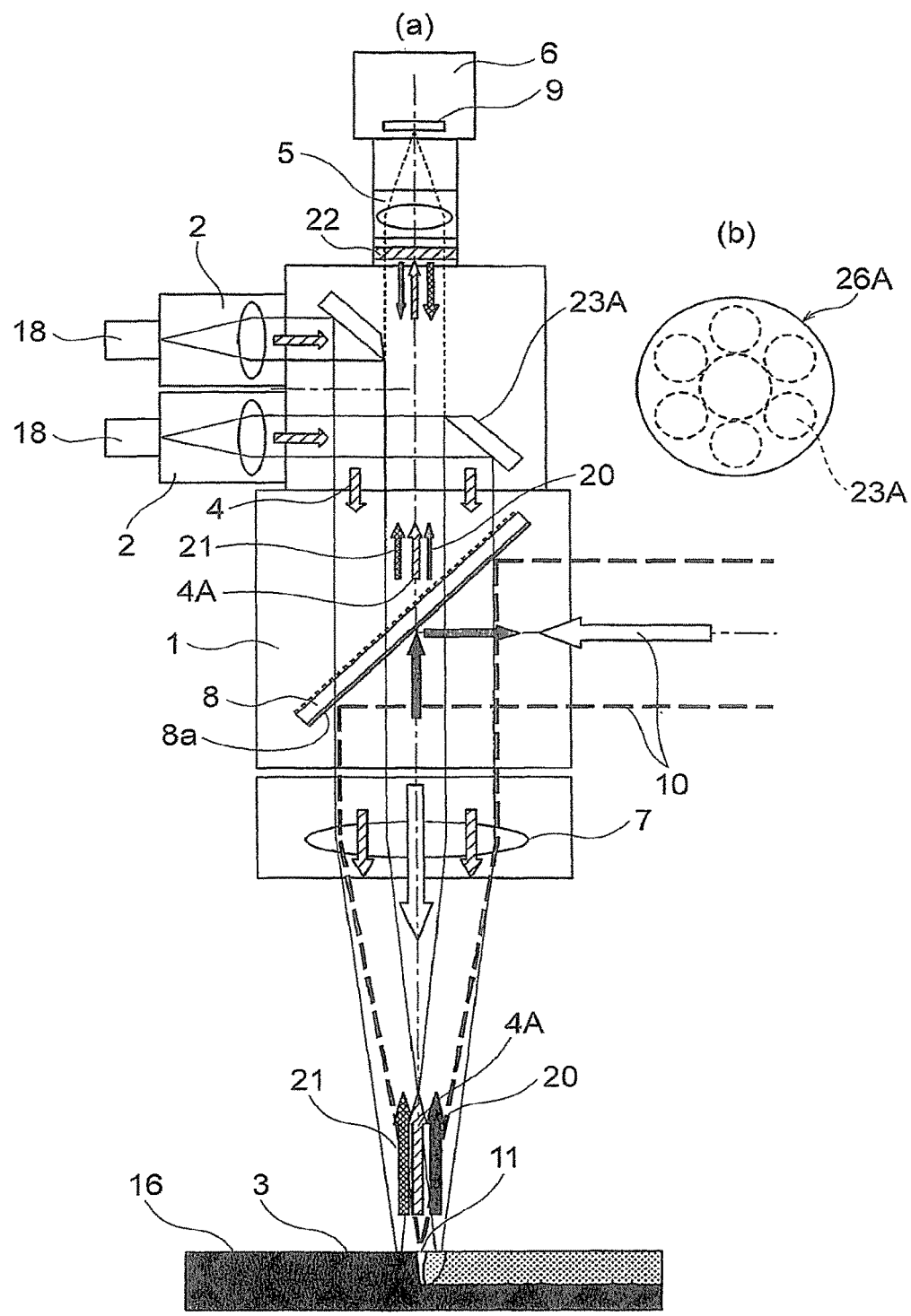
FIG. 14A is a schematic diagram depicting a laser processing head apparatus with a CMOS camera monitor according to Embodiment 8 of the present invention.
FIG. 14B is a top view of the illumination light reflection mirror of FIG. 14A.

FIG. 14 is a schematic diagram depicting a laser processing head apparatus according to Embodiment 8 of the present invention.

In this embodiment, the light source for illumination 18 is directly coupled with the illumination optical system 2, unlike the transmission fiber-coupling type laser processing head apparatuses of Embodiments 1 to 7.

The rest of the configuration is the same as the laser processing head apparatus of Embodiment 3.

According to the laser processing head apparatus of Embodiment 8, the mixing of different LD light rays and uniformity in the cross-section of beams are inferior to the transmission fiber-coupling type, but the beams are superimposed on about 100% of the surface 16 of the processing material 3, which is an illumination target, and uniform illumination and speckle reduction can be implemented.

Further, the transmission fiber 19 is not provided, which reduces the size and cost of the laser processing head apparatus.

[Embodiment 9]

Figure 15:
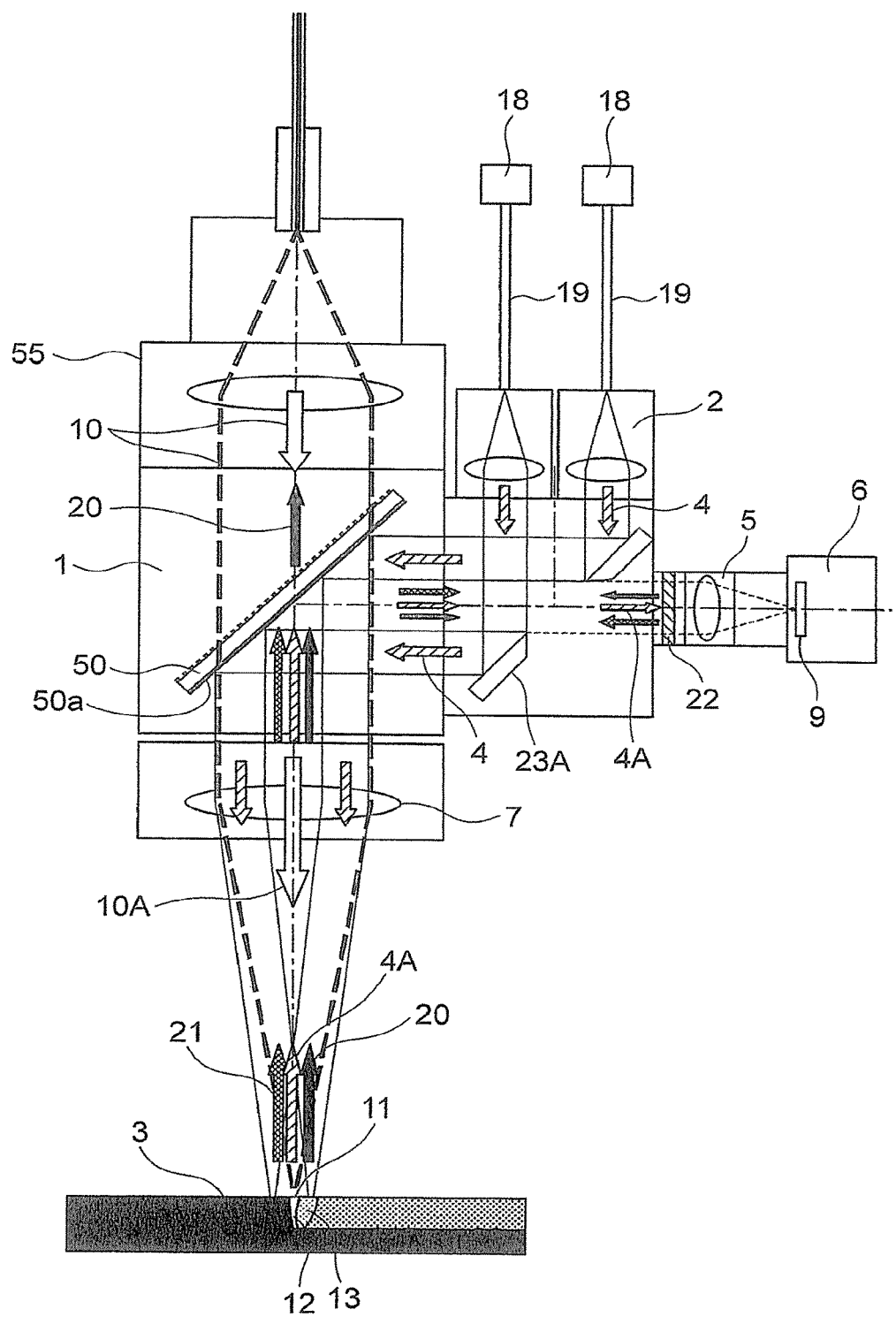
FIG. 15 is a schematic diagram depicting a laser processing head apparatus with a CMOS camera monitor according to Embodiment 9 of the present invention.

FIG. 15 is a schematic diagram depicting a laser processing head apparatus according to Embodiment 9 of the present invention.

In Embodiments 1 to 8, the laser beam for processing 10 is deflected by the laser beam reflection mirrors 8 or 8A, and the imaging optical system 5 and the illumination optical system 2 are disposed on the opposite side of the condensing lens 7 with respect to the laser beam reflection mirror 8.

In Embodiment 9, however, a dichroic mirror 50 is disposed on the optical path of the laser beam for processing 10, and the imaging optical system 5 and the illumination optical system 2 are disposed on the condensing lens 7 side of the dichroic mirror 50, so as to be distant from the optical axes of the laser beam for processing 10 and the processing point-reflected laser beam 20 in the diameter direction.

The dichroic mirror 50 transmits 99% or more of the laser beam for processing 10 and the processing point-reflected laser beam 20, and reflects 80% or more of the illumination light 4, the illumination light for imaging 4A, and the processing point-emitted light 21. The dichroic mirror 50 also transmits 50% or more of the visible laser beam for guiding, which is superimposed with the laser beam for processing 10.

The rest of the configuration is the same as the laser processing head apparatus of Embodiment 3.

According to the laser processing head apparatus of Embodiment 9, the dichroic mirror 50, which transmits the laser beam for processing 10 and the processing point-reflected laser beam 20 and reflects the illumination light 4, the illumination light for imaging 4A and the processing point-emitted light 21, is disposed on the optical path of the laser beam for processing 10, whereby the housing 55 encasing the optical path of the laser beam for processing 10 becomes linear, the processing head main unit 1 which requires water cooling can assume a slim design, and installation of the laser processing head apparatus in the scanning mechanism becomes easy.

The illumination light 4, which is disposed in the diameter direction with respect to the housing 55 and passes through the illumination optical system 2 and the imaging optical system 5, is several tens W or less (low output light), just like that of Embodiments 1 to 8, therefore it is unnecessary to water-cool the surrounding area, and the cross-section of the illumination light 4 can be smaller than the housing 55. By deflecting the laser light for processing 10 at a right angle with respect to the optical axis of the illumination light for imaging 4A passing through the imaging optical system 5, the size of the camera 6 can be decreased in the diameter direction of the laser processing head apparatus.

[Embodiment 10]

Figure 16:
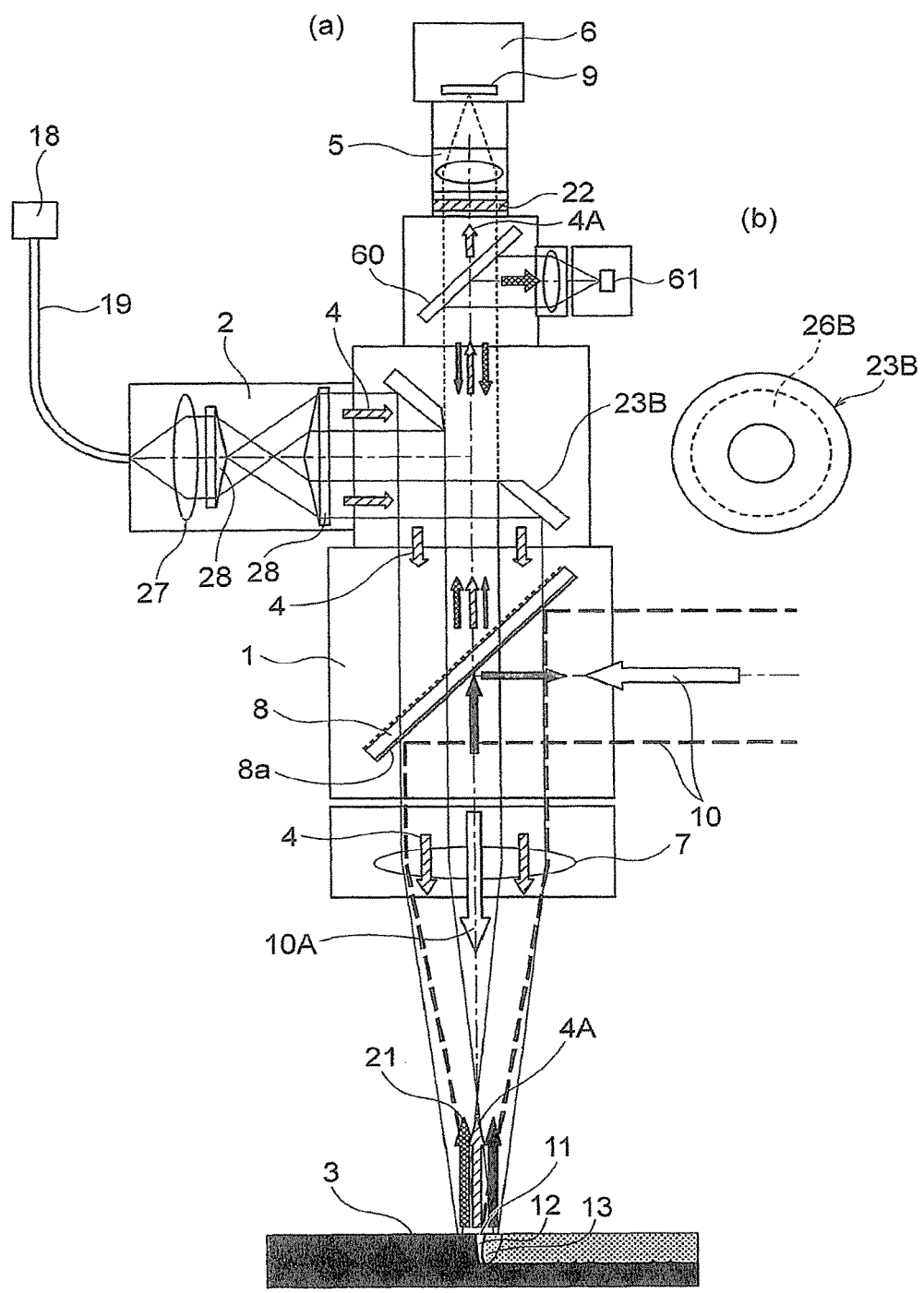
FIG. 16 is a schematic diagram depicting a laser processing head apparatus with a CMOS camera monitor according to Embodiment 10 of the present invention.

FIG. 16A is a schematic diagram depicting a laser processing heat apparatus according to Embodiment 10 of the present invention, and FIG. 16B is a top view of an illumination light reflection mirror 23B of FIG. 15A.

In Embodiment 10, a beam splitter 60 is disposed on the imaging optical path between the illumination light reflection mirror 23B and the camera 6, and a part of the processing point-emitted light 21 from the processing point 11, reflected by the beam splitter 60, is monitored by a photosensor 61.

The wavelength region of the processing point-emitted light 21 to be monitored is a part of or all of the wavelength region. The rest of the configuration is the same as the laser processing head apparatus of Embodiment 4.

According to the laser processing head apparatus of Embodiment 10, the processing point-emitted light 21 in the ultrared to the infrared region can be monitored by the photosensor 61 disposed on the imaging optical system 5 side of the laser beam reflection mirror 8, hence the emission spectral state, such as the intensity of light having a specific wavelength, related to the quality of the laser processing state, can be monitored, and the quality of the laser processing state can be accurately judged based on the image information on the processing point 11 and the peripheral area thereof in the imaging region 17.

Further, all of the illumination optical system 2, the imaging optical system 5 and the photosensor 61 can be integrated with the processing head main unit 1, and disposed on the rear face of the laser beam reflection mirror 8, hence the distance between the condensing lens 7 and the processing material 3 can be decreased, a compact laser processing head apparatus can be implemented, and contamination of the illumination optical system 2 and the imaging optical system 5, caused by sputtering and the like, can be prevented.

In each of the above embodiments, a CMOS camera 6 is used as the camera, but a CCD (Charge Coupled Device) camera may be used instead.

Use of the photosensor 61 to accurately judge the quality of the laser processing state can also be applied to the laser processing head apparatuses of embodiments other than Embodiment 4.

Further, in the laser processing head apparatus of Embodiment 7, an illumination light reflection mirror, configured to reflect the illumination light 4 generated in the light source for illumination 18 toward the laser beam reflection mirror 8A, may be disposed on a part of the imaging optical path between the imaging optical system 5 and the laser beam reflection mirror 8A.

REFERENCE SIGNS LIST

1 Processing head main unit
2 Illumination optical system
3 Processing material
4 Illumination light
4A Illumination light for imaging
5 Imaging optical system
6 CMOS camera
7 Condensing lens
8, 8A Laser beam reflection mirror
8a, 8Aa Surface
9 Imaging plane
10 Laser beam for processing
10A Reflected laser beam for processing
11 Processing point
12 Processing hole
13 Welding pool
14 Weld bead
15 Cutting groove
16 Surface
17 Imaging region
18 Light source for illumination
19 Transmission fiber
20 Processing point-reflected laser beam
21 Processing point-emitted light
22 Optical filter
23, 23A, 23B, 23C Illumination light reflection mirror
24 Edge
25 Imaging region
26, 26A, 26B Illumination light reflection region
27 Convex lens
28 Axicon lens
29 Support member
30 Dielectric substrate
31 Metal plate
40 LD bar
41 Shaping/collecting optical system
42 LD chip
43 Polarization beam splitter
44 Shaping optical system
45 Collecting optical system
46, 50 Dichroic mirror
55 Housing
60 Beam splitter
61 Photosensor

The invention claimed is:

1. A laser processing head apparatus with a camera monitor, comprising:
   a laser beam reflection mirror that reflects and deflects a laser beam for processing and changes an advancing direction of the laser beam for processing;
   a condensing lens that collects a reflected laser beam for processing, which has been reflected by the laser beam reflection mirror, to a processing point of a processing material;
   a camera that is disposed on an opposite side of the laser beam reflection mirror to the condensing lens and on the same axis as an optical axis of the reflected laser beam for processing;
   an imaging optical system that is disposed between the camera and the laser beam reflection mirror and on the same axis as the optical axis of the reflected laser beam for processing;
   an illumination optical system that is disposed on an imaging optical system side of the laser beam reflection mirror;
   a light source for illumination that generates an illumination light which passes through the illumination optical system and the laser beam reflection mirror and irradiates the processing point; and
   an optical filter that is disposed on a laser beam reflection mirror side of the imaging optical system, wherein
   the reflected laser beam for processing generates processing point-emitted light including plasma by irradiating the processing point, or is reflected at the processing point and becomes a processing point-reflected laser beam, and the illumination light is reflected at the processing point and becomes illumination light for imaging, the light source for illumination includes a near-infrared laser diode which generates a near-infrared laser beam of which upper limit value is a wavelength of the laser beam for processing, an optical path of the illumination light and an imaging optical path, which is an optical path of the illumination light for imaging, are different optical paths that contact with each other, the illumination light is directly guided to a laser optical path for processing, which is an optical path of the laser beam for processing, or guided to the laser optical path for processing via an illumination light reflection mirror, which is disposed on a part of the imaging optical path between the imaging optical system and the laser beam reflection mirror, and which reflects the illumination light generated by the light source for illumination toward the laser beam reflection mirror, the illumination light reflection mirror is a total-reflection mirror or a metal mirror, the laser beam reflection mirror reflects 99% or more of the laser beam for processing, and transmits 80% or more of the illumination light and the illumination light for imaging, and out of the processing point-emitted light, the processing point-reflected laser beam and the illumination light for imaging, which have passed through the condensing lens and the laser beam reflection mirror and are directed to the camera respectively, the optical filter blocks transmission of the processing point-emitted light and the processing point-reflected laser beam, and transmits the illumination light for imaging.

2. A laser processing head apparatus with a camera monitor, comprising:

a laser beam reflection mirror that reflects and deflects a laser beam for processing and changes an advancing direction of the laser beam for processing;

a condensing lens that collects a reflected laser beam for processing, which has been reflected by the laser beam reflection mirror, to a processing point of a processing material;

a camera that is disposed on an opposite side of the laser beam reflection mirror to the condensing lens and on the same axis as the optical axis of the reflected laser beam for processing;

an imaging optical system that is disposed between the camera and the laser beam reflection mirror and on the same axis as the optical axis of the reflected laser beam for processing;

an illumination optical system that is disposed on an imaging optical system side of the laser beam reflection mirror; and a light source for illumination that generates illumination light that passes through the illumination optical system and the laser beam reflection mirror and irradiates the processing point, wherein the reflected laser beam for processing generates processing point-emitted light including plasma by irradiating the processing point, or is reflected at the processing point and becomes a processing point-reflected laser beam, and the illumination light is reflected at the processing point and becomes illumination light for imaging, the light source for illumination includes a near-infrared laser diode that generates a near-infrared laser beam of which upper limit value is a wavelength of the laser beam for processing, an optical path of the illumination light and an imaging optical path, which is an optical path of the illumination light for imaging, are different optical paths that contact with each other, the illumination light is directly guided to a laser optical path for processing, which is an optical path of the laser beam for processing, or guided to the laser optical path for processing via an illumination light reflection mirror, which is disposed on a part of the imaging optical path between the imaging optical system and the laser beam reflection mirror, and which reflects the illumination light generated by the light source for illumination toward the laser beam reflection mirror, the illumination light reflection mirror is a total-reflection mirror or a metal mirror, the laser beam reflection mirror reflects 99% or more of the laser beam for processing, and transmits 80% or more of the illumination light and the illumination light for imaging, and out of the processing point-emitted light, the processing point-reflected laser beam and the illumination light for imaging, which have passed through the condensing lens and are directed to the camera respectively, the laser beam reflection mirror blocks transmission of the processing point-emitted light and the processing point-reflected laser beam, and transmits the illumination light for imaging.

3. A laser processing head apparatus with a camera monitor, comprising:

a dichroic mirror that transmits a laser beam for processing;

a condensing lens that is disposed on an optical axis of the laser beam for processing, and collects the laser beam for processing to a processing point of a processing material;

a camera that is disposed on a condensing lens side of the dichroic mirror so as to be distant from the optical axis in a diameter direction;

an imaging optical system that is disposed between the camera and the dichroic mirror;

an illumination optical system that is disposed on an imaging optical system side of the dichroic mirror;

a light source for illumination that generates illumination light which passes through the illumination optical system, is reflected by the dichroic mirror, and irradiates the processing point; and an optical filter that is disposed on a dichroic mirror side of the imaging optical system, wherein the laser beam for processing that has passed through the dichroic mirror generates processing point-emitted light including plasma by irradiating the processing point, or is reflected at the processing point and becomes a processing point-reflected laser beam, and the illumination light is reflected at the processing point and becomes illumination light for imaging, the light source for illumination includes a near-infrared laser diode that generates a near-infrared laser beam of which upper limit value is a wavelength of the laser beam for processing, an optical path of the illumination light and an imaging optical path, which is an optical path of the illumination light for imaging, are different optical paths that contact with each other, the illumination light is directly guided to a laser optical path for processing, which is an optical path of the laser beam for processing, or guided to a laser optical path for processing via an illumination light reflection mirror, which is disposed on a part of the imaging optical path between the imaging optical system and the dichroic mirror, and which reflects the illumination light generated by the light source for illumination toward the dichroic mirror, the illumination light reflection mirror is a total-reflection mirror or a metal mirror, the dichroic mirror transmits 99% or more of the laser beam for processing, reflects 80% or more of the illumination light and the illumination light for imaging, or transmits 80% or more of the illumination light and the illumination light for imaging, and out of the processing point-emitted light and the illumination light for imaging, which have passed through the condensing lens, are reflected by the dichroic mirror and are directed to the camera respectively, the optical filter blocks the processing point-emitted light and transmits the illumination light for imaging.

4. The laser processing head apparatus with a camera monitor according to claim 1, wherein
the illumination light reflection mirror has a semicircular shape and is disposed in a biased state within the imaging optical path.

5. The laser processing head apparatus with a camera monitor according to claim 1, wherein
the illumination light reflection mirror has an annular shape that has at a center an opening, and a plurality of illumination light rays are independently irradiated onto a surface of the illumination light reflection mirror along a circumferential direction.

6. The laser processing head apparatus with a camera monitor according to claim 1, wherein
the illumination light reflection mirror has an annular shape that has at a center an opening, and a single annular illumination light is irradiated onto the surface of a illumination light reflection mirror along a circumferential direction.

7. The laser processing head apparatus with a camera monitor according to claim 6, wherein
the illumination optical system includes an axicon lens for forming the annular illumination light.

8. The laser processing head apparatus with a camera monitor according to claim 1, wherein
the illumination light reflection mirror is installed at a center of the imaging optical path by a support member constituted by a support ring and a support post, and
a part of an optical path space for imaging by the camera is created between the support member and the illumination light reflection mirror.

9. The laser processing head apparatus with a camera monitor according to claim 1, wherein
the illumination light reflection mirror is disposed at a center of the imaging optical path and at a center of a dielectric substrate through which the illumination light for imaging passes.

10. The laser processing head apparatus with a camera monitor according to claim 2, wherein
the illumination light reflection mirror has a semicircular shape and is disposed in a biased state within the imaging optical path.

11. The laser processing head apparatus with a camera monitor according to claim 2, wherein
the illumination light reflection mirror has an annular shape that has at a center an opening, and a plurality of illumination light rays are independently irradiated onto a surface of the illumination light reflection mirror along a circumferential direction.

12. The laser processing head apparatus with a camera monitor according to claim 2, wherein
the illumination light reflection mirror has an annular shape that has at a center an opening, and a single annular illumination light is irradiated onto the surface of a illumination light reflection mirror along a circumferential direction.

13. The laser processing head apparatus with a camera monitor according to claim 12, wherein
the illumination optical system includes an axicon lens for forming the annular illumination light.

14. The laser processing head apparatus with a camera monitor according to claim 2, wherein
the illumination light reflection mirror is installed at a center of the imaging optical path by a support member constituted by a support ring and a support post, and
a part of an optical path space for imaging by the camera is created between the support member and the illumination light reflection mirror.

15. The laser processing head apparatus with a camera monitor according to claim 2, wherein
the illumination light reflection mirror is disposed at a center of the imaging optical path and at a center of a dielectric substrate through which the illumination light for imaging passes.

16. The laser processing head apparatus with a camera monitor according to claim 3, wherein
the illumination light reflection mirror has a semicircular shape and is disposed in a biased state within the imaging optical path.

17. The laser processing head apparatus with a camera monitor according to claim 3, wherein
the illumination light reflection mirror has an annular shape that has at a center an opening, and a plurality of illumination light rays are independently irradiated onto a surface of the illumination light reflection mirror along a circumferential direction.

18. The laser processing head apparatus with a camera monitor according to claim 3, wherein
the illumination light reflection mirror has an annular shape that has at a center an opening, and a single annular illumination light is irradiated onto the surface of a illumination light reflection mirror along a circumferential direction.

19. The laser processing head apparatus with a camera monitor according to claim 18, wherein
the illumination optical system includes an axicon lens for forming the annular illumination light.

20. The laser processing head apparatus with a camera monitor according to claim 3, wherein
the illumination light reflection mirror is installed at a center of the imaging optical path by a support member constituted by a support ring and a support post, and
a part of an optical path space for imaging by the camera is created between the support member and the illumination light reflection mirror.

* * * * *